United States Patent [19]

Ekis, Jr. et al.

[11] Patent Number: 5,209,934
[45] Date of Patent: * May 11, 1993

[54] ZEBRA MUSSEL CONTROL CHEMICAL

[75] Inventors: Edward W. Ekis, Jr., Naperville, Ill.; Andrew J. Kern, Youngstown, Ohio

[73] Assignee: Nalco Chemical Company, Naperville, Ill.

[*] Notice: The portion of the term of this patent subsequent to Aug. 25, 2009 has been disclaimed.

[21] Appl. No.: 895,746

[22] Filed: Jun. 9, 1992

Related U.S. Application Data

[63] Continuation of Ser. No. 591,201, Oct. 1, 1990, Pat. No. 5,141,754.

[51] Int. Cl.$^5$ .................. A01N 59/08; A01N 59/00; C02F 1/68
[52] U.S. Cl. .................................. 424/661; 424/665; 424/723; 210/754; 523/122
[58] Field of Search ............... 424/611, 665, 723; 210/754; 523/122

[56] References Cited

U.S. PATENT DOCUMENTS

| | | | |
|---|---|---|---|
| 4,643,835 | 2/1987 | Koeplin-Gall | 210/754 |
| 4,872,999 | 10/1989 | Schild et al. | 210/754 |
| 5,141,754 | 9/1992 | Ekis, Jr. et al. | 424/661 |

Primary Examiner—Thurman K. Page
Assistant Examiner—Peter F. Kulkosky
Attorney, Agent, or Firm—Robert A. Miller; John G. Premo; Joseph B. Barrett

[57] ABSTRACT

Zebra Mussels can be controlled by treating the waters in which they grow with a composition comprising the combination of a chlorine solution and a bromide salt capable of releasing bromide ions to the chlorine solution.

4 Claims, No Drawings

ZEBRA MUSSEL CONTROL CHEMICAL

This application is a continuation of application Ser. No. 07/591,201, filed Oct. 1, 1990, now U.S. Pat. No. 5,141,754.

INTRODUCTION

This invention is a chemical program which controls the Zebra Mussel (*Dreissena polymorpha*) better than chlorination. Chlorination is currently the most commonly used program for the control of the Zebra Mussel.

The chemical program consists of:
1. a chemical which is a bromide salt, with or without a surfactant plus a chlorine source;
2. a feed system which is capable of combining the bromide salt solution with concentrated chlorine, either gas or liquid.

Zebra Mussel fouling has been known in Europe for years. Its occurrence in North America was discovered in 1988 in the Great Lakes region. In both once through and recirculating cooling water systems, water may discharge directly back into a river or lake. Any treatment program added to control the Zebra Mussel population must be capable of discharge so as not to cause environmental toxicity. For this reason, a common technology for macrofouling control is continuous, low level chlorination during the spawning season.

The primary advantage of this invention is that this macrofouling control program offers a significant reduction in the amount of time required to kill this Zebra Mussel.

THE INVENTION

The present invention provides a method for preventing the growth and attachment of Zebra Mussels to solid surfaces which are in contact with waters which contain Zebra Mussels which comprises treating such waters with a composition comprising a chlorine solution and a bromide salt capable of releasing bromide ions to the chlorine solution. The dosage of the composition required to effectively control the Zebra Mussels may be as little as 0.05 up to as high as 5–10 mg/L based on the weight of the water containing the mussels.

THE BROMIDE SALTS

Suitable bromide salts include the alkali and alkaline earth metal bromides but are not limited thereto. For instance, magnesium bromide, calcium bromide, sodium bromide, potassium bromide, ammonium bromide, and the like salts can be used, either singly or as mixture of two or more as desired.

A bromide salt, for example, sodium bromide, when introduced into a chlorine solution in which the chlorine is present mostly as hypochlorous acid, has been shown to at least partially displace chlorine, resulting in the formation of the active biocide, hypobromous acid, and innocuous sodium chloride by-product as follows:

$$NaBr + HOCl \rightarrow NaCl + HOBr$$

In present chlorination installations, the bromide salt can merely be introduced downstream of the chlorine educting water line, at which point gaseous chlorine has already been introduced into a water stream and hydrolized to form the hypochlorous acid, which usually would be an acidic chlorine solution. It can also be introduced into sodium hypochlorite solutions and will undergo the same reactions.

The bromide salts are themselves generally innocuous salts and thus their use in combination with chlorine presents no new or unknown hazards and makes use of the same chlorine introduction facilities that are now in use.

THE CHLORINE SOLUTIONS

Such chlorine solutions can be prepared by the dissolution of gaseous chlorine in water, forming through hydrolysis hypochlorous acid and hydrochloric acid; chlorine solutions of sodium hypochlorite will also work. By the term, "aqueous chlorine solution," as used herein, is meant solutions equivalent to that derived from dissolution of chlorine in water or acidic solutions containing chlorine as the hypochlorous acid or solutions of sodium or calcium hypochlorite.

One feature of the combination forming the compositions is the formation of hypobromous acid by the displacement of at least some chlorine of the hypochlorous acid with bromine derived from the bromide salt, forming a generally innocuous chloride salt by-product. Thus the composition is a combination which includes at least some hypobromous acid and is thus more effective in typical water systems at least due to the greater activity of bromamines over chloramines that are formed when ammonia is present in the system. The compositions result in effluent discharges of lower toxicity due at least to the greater instability of bromine residuals.

The degree of conversion of hypochlorous acid to hypobromous acid depends of course to an extent on the relative proportion of bromide salt to hypochlorous acid which are combined to form the composition and other factors affecting the displacement of chlorine with bromine.

The compositions used in the present invention are particularly suited for any water system already set up with a chlorination purification system and thus already equipped with appropriate apparatus for metering and introducing chlorine to the water system, but is, of course, not limited thereto. As mentioned above, many chlorination systems derive chlorine from pressurized cylinders, as gaseous chlorine, and meter the chlorine as a gas. In such systems it may be advantageous to retain the same equipment and convert at least some of the hypochlorous acid to hypobromous acid by the introduction of the bromide salt downstream of the chlorine educting water line, preferably prior to the point at which the water stream enters the main water system.

The compositions used in the present invention include those wherein the chlorine solution is prepared other than from dissolution of gaseous chlorine, such as chlorine obtained from sodium or calcium hypochlorite solutions.

The preferred pH range for forming the compositions is from about 2.0 to about 13.0. Sodium hypochlorite solutions may be at pH 13.0 or so. The above described compounds are added directly to this line and the reaction occurs and kills biological species.

The species can be formed at pH values from 2–13. After the formation, the composition will be introduced into water systems wherein the overall pH is not within these ranges and may well not even be acidic.

THE PROPORTIONS OF BROMIDE SALT TO CHLORINE

Although the present invention encompasses any proportion of bromide salt to chlorine, in preferred embodiment, the present invention includes the combination of bromide salt to chlorine as the hypochlorous acid in the proportion of about 0.25 to about 1.5 equivalents and, more preferably, about 0.5 to about 1.0 equivalents (chemical equivalent weight basis). 1:1 is even more preferable.

USE WITH BIODISPERSANTS

In a preferred embodiment of the invention, the chlorine and bromine containing compositions are rendered more effective by the inclusion therewith of surface active agents which may, for purposes of convenience, be referred to as "biodispersants." When these materials are used, the amount present in the composition ranges between about 1 up to about 10% by weight. In a less preferred embodiment the biodispersant may be fed separately, e.g., downstream.

The biodispersants are preferably chosen from the group consisting of ethylene oxide condensates with propylene oxide adducts or propylene glycol having an HLB between 4–10 and a molecular weight between 1000–5000, nonionic polyethoxylated straight chain alcohols, tris cyanoethylated cocodiamines, polyoxyethylene sorbitan ester/acids, nonionic N,N, dimethyl stearamides, nonionic amine polyglycol condensates, and nonionic ethoxylated alcohols. Table 1 shows the types of chemicals which have been demonstrated to have biodispersant properties.

TABLE 1

Evaluation of Compounds for Biodispersancy
10 ppm with 1 hour contact
Data Collected with Biometer

| Dispersant Chemical Type | Biomass Change |
| --- | --- |
| nonionic (polyol) condensate of ethylene oxide with hydrophobic bases (propylene oxide with propylene glycol) | 66.4% |
| nonionic polyethoxylated straight chain alcohol | 58.5% |
| tris cyanoethyl cocodiamine | 47.3% |
| polyoxyethylene sorbitan ester of fatty and resin acids and alkyl aryl sulfonate blend (nonionic) | 45.8% |
| cationic ethylene oxide condensation products of Duomeen T* | 35.8% |
| nonionic N.N-dimethyl stearamide | 34.7% |
| monoamine (cationic) (cocomononitrile) | 31.3 |
| low MW polyacrylate (MW 1000–10,000) | 31.1% |
| nonionic amine polyglycol condensate | 30.0% |
| cationic - cocodiamine | 25.6% |
| nonionic ethoxylated alcohol | 21.2% |

*Duomeen T = tallow-trimethylene diamine

The % biomass change in Table 1 was measured by exposing a slime mass previously grown and attached onto a surface to clear recirculating water at about 100° F. The water contained 10 ppm of each of the indicated biodispersants and it was allowed to recirculate at temperature for one hour. At the end of that time period, a biomass assay was made of water collected in a common basin by using a duPont 760 Luminescence Biometer which is described in the publication, "duPont 760 Luminescene Biometer," published in December, 1970, and described in U.S. Pat. No. 3,359,973, which is incorporated herein by reference.

This Table shows the percent of clumped biomass dispersed by treatment with 10 ppm of the indicated dispersant. Although other dispersants were tested which had lower than 20% effectiveness, this data is not presented since any dispersant having less than 20% effectiveness in these tests would be found not to function adequately in this invention.

While we have referred to these materials as biodispersants, their function is to improve the penetration of compositions used in this invention into the intercies of the mussel thereby making the compositions more effective in killing these biological species. It is thought also that the biodispersants aid in preventing attachment of the mussels to hard surfaces via byssal thread connections.

THE DOSAGE

The dosages of the compositions may be selected from the following ranges:

| General | 0.05–10 mg/l of water |
| --- | --- |
| Preferred | 0.1–5 mg/l of water |
| Most preferred | 0.5–2 mg/l of water |

EVALUATION OF THE INVENTION

In the following test methods, the source of bromine was derived from a composition hereafter referred to as Composition A.

| COMPOSITION A | |
| --- | --- |
| Ingredients | % by Weight |
| Soft Water | 3.9 |
| Water-soluble octyl phenol reacted with ethylene oxide in an amount sufficient to provide a biodispersant | 1.0 |
| Sodium bromide (45% solution) | 95.1 |

The chlorine solution was Clorox, a 5.25% NaOCL solution.

METHODS

Collection and Holding

Zebra Mussels were collected from a population in the intake bay of a plant located on Lake Erie. The animals were packed in damp burlap and sent to the laboratory by overnight courier. The mussels were allowed to acclimate to the test temperature overnight in the shipping container. The animals were acclimated to laboratory well water for ten days prior to exposure. During the acclimation period, the animals were fed strained baby spinach which was homogenized in a commercial blender with well water. The homogenate was allowed to stand for an approximate ten minute period to allow the larger particles to settle out of suspension. The supernatant, containing the finer spinach particles, was used to feed the mussels. The mussels were fed on alternate days at a rate at which the acclimation tanks were clear of any visible spinach twenty minutes after feeding. The mussels were not fed during the definitive test.

Mussel Size

Mussels of two sizes were acclimated for testing. The larger mussels had mean length of 22.6 mm+2.1 mm.

The smaller mussels had a mean length of 9.9 mm+4.5 mm. The means lengths were determined by measuring one hundred randomly selected specimens from each group. Lengths were measured using a vernier caliper. Mean wet weight (whole animal) for the large mussels was 1.8 g±0.5 g and 0.25 g±0.1 g for the small mussels.

Test Chambers

All testing was conducted in wide-mouth glass gallon jars. The test chamber was cleaned using hot soapy water, tap water rinse, ten percent nitric acid rinse, tap water rinse, pesticide grade acetone rinse, distilled water rinse.

Loading

Test volume was two liters per chamber. The large mussels were divided into two test chambers at ten mussels per chamber. The small mussels were loaded at twenty mussels per single test chamber. All chambers were permanently marked. The small mussels were loaded in the Composition A replicate chamber in mesh bags.

Test Type

The Composition A bioassay was conducted using renewal of the five test concentrations and control every four hours for the 168 hours. The animals were exposed to the product for twenty minutes after which the product was decanted and fresh well water added for the remainder of the four hour period. The Composition A and Clorox stock solutions were freshly prepared for each exposure period.

Test Duration

Testing consisted of seven day exposure followed by a four day latent response observation period.

Dilution Water

Well water was used for dilution water. The well water was held in analytically clean 15 gallon carboys prior to use. The carboys were used to allow the well water to reach the test temperature. During the temperature adjustment, the carboys were aerated to achieve dissolved oxygen saturation. The temperature adjusted and air saturated water was used as dilution water.

Test Temperature

Testing was conducted in a temperature controlled laboratory at 20±2° C.

Test Concentrations

The Composition A and Clorox testing was conducted using two different chlorine-bromine ratios. The stock solutions consisted of 6.5 ml Composition A plus 100 ml Clorox (6.5:100) and 13 ml Composition A plus 100 ml Clorox (13:100). In addition pure Clorox was also tested.

The 6.5:100 and 13:100 Composition A plus Clorox and pure Clorox were added to the two liters of well water at volumes that resulted in twenty minute Total Residual Chlorine (TRC) levels of 0.1, 0.2, 0.5, 1.0, and 2.0 ppm TRC.

End Point

Death was determined by gaping of unopposed (little or no resistance) lateral shell displacement by using the thumb and index finger.

Physical-Chemical Determinations

Physical-chemical parameters were determined daily using the following instruments:
Dissolved Oxygen—YSI Model 57 Dissolved Oxygen Meter
Conductivity—YSI Model 33 SCT
Temperature—YSI Model 33 SCT
pH—Analytic Measurement Model 707
Total Residual Chloride—DPD (N,N-diethyl-p-phenylenediamine)

RESULTS AND DISCUSSION

Physical-chemical measurements (except TRC) were made at 0 and 24 hours in the 6.5 Composition A:100 Clorox and 13 Composition A:100 Clorox and pure Clorox test chambers and are presented in Tables 2, 3, and 4, respectively. Readings were taken on the carboys holding the well water for Days 2 through 7.

TABLE 2

Composition A (6.5 ml) + Clorox (100 ml) Physical-Chemical Measurements (*Dreissena polymorpha*)

| Day | Hour | Target TRC (ppm) | Dissolved oxygen (ppm) | Temperature (C.) | pH | Conductivity (micromho/cm) |
|---|---|---|---|---|---|---|
| 0 | 0 | Control | 8.6 | 20.0 | 7.4 | 295 |
|   |   | 0.1 | 8.8 | 20.0 | 7.4 | 295 |
|   |   | 0.2 | 8.7 | 20.0 | 7.4 | 295 |
|   |   | 0.5 | 8.8 | 20.0 | 7.5 | 295 |
|   |   | 1.0 | 8.8 | 20.0 | 7.5 | 290 |
|   |   | 2.0 | 8.9 | 20.0 | 7.5 | 290 |
| 1 | 24 | Control | 8.8 | 18.5 | 7.5 | 280 |
|   |   | 0.1 | 9.1 | 18.5 | 7.6 | 280 |
|   |   | 0.2 | 9.2 | 18.5 | 7.5 | 280 |
|   |   | 0.5 | 8.2 | 18.5 | 7.6 | 280 |
|   |   | 1.0 | 9.2 | 18.5 | 7.7 | 280 |
|   |   | 2.0 | 9.2 | 18.5 | 7.7 | 280 |
| Dilution water - | | | | | | |
| 2 | 48 |  | 9.9 | 19.0 | 7.6 | 285 |
| 3 | 72 |  | 9.2 | 19.0 | 7.8 | 285 |
| 4 | 96 |  | 8.9 | 18.5 | 7.7 | 280 |
| 5 | 120 |  | 8.6 | 18.5 | 7.7 | 290 |
| 6 | 144 |  | 9.4 | 18.5 | 8.0 | 270 |
| 7 | 168 |  | 9.0 | 19.0 | 7.6 | 275 |

TABLE 3

Composition A (13 ml) + Clorox (100 ml) Physical-Chemical Measurements (*Dreissena polymorpha*)

| Day | Hour | Target TRC (ppm) | Dissolved oxygen (ppm) | Temperature (C.) | pH | Conductivity (micromho/cm) |
|---|---|---|---|---|---|---|
| 0 | 0 | Control | 8.7 | 20.0 | 7.3 | 295 |
|   |   | 0.1 | 8.8 | 20.0 | 7.4 | 295 |
|   |   | 0.2 | 8.8 | 20.0 | 7.4 | 290 |
|   |   | 0.5 | 8.7 | 20.0 | 7.4 | 290 |
|   |   | 1.0 | 8.8 | 20.0 | 7.4 | 290 |
|   |   | 2.0 | 8.8 | 20.0 | 7.4 | 290 |
| 1 | 24 | Control | 9.2 | 18.5 | 7.4 | 280 |
|   |   | 0.1 | 9.2 | 18.5 | 7.5 | 280 |
|   |   | 0.2 | 9.4 | 18.5 | 7.5 | 280 |
|   |   | 0.5 | 9.1 | 18.5 | 7.7 | 280 |
|   |   | 1.0 | 9.1 | 18.5 | 7.7 | 280 |
|   |   | 2.0 | 9.2 | 18.5 | 7.7 | 280 |
| Dilution water - | | | | | | |
| 2 | 48 |  | 10.1 | 18.5 | 7.6 | 285 |
| 3 | 72 |  | 8.8 | 18.5 | 7.5 | 290 |
| 4 | 96 |  | 8.6 | 19.0 | 7.6 | 285 |
| 5 | 120 |  | 9.0 | 18.0 | 7.7 | 250 |
| 6 | 144 |  | 9.1 | 18.0 | 7.7 | 275 |

TABLE 3-continued

Composition A (13 ml) + Clorox (100 ml) Physical-Chemical Measurements (*Dreissena polymorpha*)

| Day | Hour | Target TRC (ppm) | Dissolved oxygen (ppm) | Temperature (C.) | pH | Conductivity (micromho/cm) |
|---|---|---|---|---|---|---|
| 7 | 168 | | 8.9 | 19.5 | 7.6 | 275 |

TABLE 4

Clorox Physical-Chemical Measurements (*Dreissena polymorpha*)

| Day | Hour | Target TRC (ppm) | Dissolved oxygen (ppm) | Temperature (C.) | pH | Conductivity (micromho/cm) |
|---|---|---|---|---|---|---|
| 0 | 0 | Control | 9.0 | 20.0 | 7.3 | 285 |
| | | 0.1 | 9.0 | 20.0 | 7.4 | 285 |
| | | 0.2 | 9.2 | 20.0 | 7.4 | 280 |
| | | 0.5 | 9.2 | 20.0 | 7.5 | 285 |
| | | 1.0 | 9.3 | 20.0 | 7.4 | 290 |
| | | 2.0 | 9.1 | 20.0 | 7.5 | 285 |
| 1 | 24 | Control | 8.5 | 19.5 | 7.7 | 280 |
| | | 0.1 | 8.6 | 19.5 | 7.6 | 290 |
| | | 0.2 | 8.5 | 19.0 | 7.6 | 280 |
| | | 0.5 | 8.6 | 19.0 | 7.7 | 275 |
| | | 1.0 | 8.7 | 19.0 | 7.7 | 275 |
| | | 2.0 | 8.7 | 19.0 | 7.6 | 275 |
| Dilution water - | | | | | | |
| 2 | 48 | | 9.7 | 19.5 | 7.6 | 290 |
| 3 | 72 | | 9.0 | 20.0 | 7.7 | 300 |
| 4 | 96 | | 9.1 | 18.5 | 7.8 | 280 |
| 5 | 120 | | 9.1 | 19.0 | 7.7 | 290 |
| 6 | 144 | | 9.4 | 18.0 | 7.6 | 275 |
| 7 | 168 | | 9.1 | 19.0 | 7.5 | 280 |

TABLE 5

Total Residual Chlorine (TRC) Measurements - (*Dreissena polymorpha*)

| Time | Target TRC (mg/l) | Clorox | Measured TRC (mg/l) Comp. A + Clorox 6.5 ml + 100 ml | Comp. A + Clorox 13 ml + 100 ml |
|---|---|---|---|---|
| 0 | 0.1 | 0.1 | 0.1 | 0.1 |
| | 0.2 | 0.2 | 0.2 | 0.15 |
| | 0.5 | 0.5 | 0.5 | 0.45 |
| | 1.0 | 1.0 | 0.6 | 1.0 |
| | 2.0 | 2.8 | 1.75 | 2.0 |
| 24 | 0.1 | 0.1 | 0.1 | 0.1 |
| | 0.2 | 0.25 | 0.2 | 0.15 |
| | 0.5 | 0.6 | 0.45 | 0.45 |
| | 1.0 | 1.5 | 1.0 | 0.9 |
| | 2.0 | 2.5 | 2.0 | 1.5 |
| 48 | 0.1 | 0.1 | 0.1 | <0.1 |
| | 0.2 | 0.2 | 0.2 | 0.15 |
| | 0.5 | 0.5 | 0.45 | 0.45 |
| | 1.0 | 1.0 | 1.0 | 0.9 |
| | 2.0 | 2.2 | 1.75 | 1.75 |
| 72 | 0.1 | 0.1 | 0.1 | 0.1 |
| | 0.2 | 0.2 | 0.2 | 0.2 |
| | 0.5 | 0.5 | 0.5 | 0.5 |
| | 1.0 | 1.0 | 1.0 | 1.0 |
| | 2.0 | 2.0 | 2.0 | 2.0 |
| 96 | 0.1 | 0.1 | 0.1 | 0.1 |
| | 0.2 | 0.2 | 0.2 | 0.2 |
| | 0.5 | 0.5 | 0.5 | 0.5 |
| | 1.0 | 1.0 | 1.0 | 1.0 |
| | 2.0 | 2.0 | 2.0 | 2.0 |
| 120 | 0.1 | 0.1 | 0.1 | 0.1 |
| | 0.2 | 0.2 | 0.2 | 0.2 |
| | 0.5 | 0.5 | 0.5 | 0.5 |
| | 1.0 | 1.0 | 1.0 | 1.0 |
| | 2.0 | 2.0 | 2.0 | 2.0 |
| 144 | 0.1 | 0.1 | 0.1 | 0.1 |
| | 0.2 | 0.2 | 0.2 | 0.2 |
| | 0.5 | 0.5 | 0.45 | 0.5 |
| | 1.0 | 1.0 | 1.0 | 1.0 |
| | 2.0 | 2.0 | 2.0 | 2.0 |

TABLE 6

Composition A - Clorox Cumulative Percent Mortality - Adult (*Dreissena polymorpha*)

| Ratio | Target TRC (mg/l) | Percent Mortality Day | | | | | | |
|---|---|---|---|---|---|---|---|---|
| | | 1 | 2 | 3 | 4 | 5 | 6 | 7 |
| 6.5:100 | Control | NO MORTALITY | | | | | | |
| | 0.1 | 0 | 10 | 10 | 20 | 20 | 20 | 20 |
| | 0.2 | NO MORTALITY | | | | | | |
| | 0.5 | NO MORTALITY | | | | | | |
| | 1.0 | 0 | 10 | 10 | 10 | 10 | 10 | 10 |
| | 2.0 | NO MORTALITY | | | | | | |
| 13:100 | Control | 0 | 0 | 0 | 10 | 10 | 10 | 10 |
| | 0.1 | NO MORTALITY | | | | | | |
| | 0.2 | NO MORTALITY | | | | | | |
| | 0.5 | 0 | 10 | 10 | 10 | 10 | 10 | 20 |
| | 1.0 | 10 | 10 | 10 | 10 | 10 | 10 | 20 |
| | 2.0 | 0 | 0 | 0 | 0 | 0 | 0 | 10 |
| Clorox | Control | | | | | | | |
| | 0.1 | | | | | | | |
| | 0.2 | NO MORTALITY | | | | | | |
| | 0.5 | | | | | | | |
| | 1.0 | ALL TEST CONCENTRATIONS | | | | | | |
| | 2.0 | | | | | | | |

TABLE 7

Composition A - Clorox Cumulative Percent Mortality - Juvenile (*Dreissena polymorpha*)

| Ratio | Target TRC (mg/l) | Percent Mortality Day | | | | | | |
|---|---|---|---|---|---|---|---|---|
| | | 1 | 2 | 3 | 4 | 5 | 6 | 7 |
| 6.5:100 | Control | NO MORTALITY | | | | | | |
| | 0.1 | NO MORTALITY | | | | | | |
| | 0.2 | 0 | 0 | 5 | 5 | 5 | 5 | 5 |
| | 0.5 | 0 | 0 | 5 | 5 | 5 | 5 | 5 |
| | 1.0 | NO MORTALITY | | | | | | |
| | 2.0 | NO MORTALITY | | | | | | |
| 13:100 | Control | NO MORTALITY | | | | | | |
| | 0.1 | 0 | 0 | 0 | 0 | 0 | 0 | 10 |
| | 0.2 | NO MORTALITY | | | | | | |
| | 0.5 | NO MORTALITY | | | | | | |
| | 1.0 | NO MORTALITY | | | | | | |
| | 2.0 | NO MORTALITY | | | | | | |
| Clorox | Control | NO MORTALITY | | | | | | |
| | 0.1 | 0 | 0 | 0 | 0 | 0 | 5 | 5 |
| | 0.2 | NO MORTALITY | | | | | | |
| | 0.5 | NO MORTALITY | | | | | | |
| | 1.0 | NO MORTALITY | | | | | | |
| | 2.0 | NO MORTALITY | | | | | | |

TABLE 8

Latent Cumulative Percent Mortality - Adult (*Dreissena polymorpha*)

| Ratio | Target TRC (mg/l) | Percent Mortality Day | | | | |
|---|---|---|---|---|---|---|
| | | 7[a] | 8[b] | 9 | 10 | 11 |
| 6.5:100 | Control | 0 | 0 | 0 | 0 | 0 |
| | 0.1 | 20 | 20 | 20 | 20 | 20 |
| | 0.2 | 0 | 0 | 0 | 0 | 0 |
| | 0.5 | 0 | 0 | 20 | 20 | 20 |
| | 1.0 | 10 | 10 | 10 | 10 | 10 |
| | 2.0 | 0 | 10 | 20 | 20 | 20 |
| 13:100 | Control | 10 | 10 | 10 | 10 | 10 |

TABLE 8-continued

Latent Cumulative Percent Mortality - Adult
(*Dreissena polymorpha*)

| Ratio | Target TRC (mg/l) | Percent Mortality Day | | | | |
|---|---|---|---|---|---|---|
| | | 7[a] | 8[b] | 9 | 10 | 11 |
| | 0.1 | 0 | 0 | 20 | 20 | 20 |
| | 0.2 | 0 | 0 | 30 | 30 | 30 |
| | 0.5 | 20 | 20 | 60 | 60 | 60 |
| | 1.0 | 20 | 20 | 70 | 70 | 70 |
| | 2.0 | 10 | 50 | 70 | 70 | 70 |
| Clorox | Control | 0 | | NO MORTALITY | | |
| | 0.1 | 0 | 0 | 20 | 20 | 20 |
| | 0.2 | 0 | | NO MORTALITY | | |
| | 0.5 | 0 | | NO MORTALITY | | |
| | 1.0 | 0 | | NO MORTALITY | | |
| | 2.0 | 0 | | NO MORTALITY | | |

[a] Day 7 - End of exposure - mussels fed.
[b] End first day in clean water.

TABLE 9

Latent Cumulative Percent Mortality - Juvenile
(*Dreissena polymorpha*)

| Ratio | Target TRC (mg/l) | Percent Mortality Day | | | | |
|---|---|---|---|---|---|---|
| | | 7[a] | 8[b] | 9 | 10 | 11 |
| 6.5:100 | Control | 0 | | NO MORTALITY | | |
| | 0.1 | 0 | | NO MORTALITY | | |
| | 0.2 | 5 | 5 | 10 | 10 | 10 |
| | 0.5 | 5 | 5 | 5 | 5 | 5 |
| | 1.0 | 0 | 0 | 5 | 15 | 15 |
| | 2.0 | 0 | 0 | 5 | 5 | 5 |
| 13:100 | Control | 0 | | NO MORTALITY | | |
| | 0.1 | 10 | 10 | 10 | 10 | 20 |
| | 0.2 | 0 | 10 | 35 | 40 | 45 |
| | 0.5 | 0 | 0 | 40 | 40 | 45 |
| | 1.0 | 0 | 0 | 50 | 50 | 50 |
| | 2.0 | 0 | 0 | 70 | 70 | 70 |
| Clorox | Control | 0 | 0 | 0 | 5 | 5 |
| | 0.1 | 5 | 5 | 5 | 5 | 5 |
| | 0.2 | 0 | | NO MORTALITY | | |
| | 0.5 | 0 | | NO MORTALITY | | |
| | 1.0 | 0 | | NO MORTALITY | | |
| | 2.0 | 0 | 5 | 5 | 5 | 5 |

[a] Day 7 - End of exposure - mussels fed.
[b] End first day in clean water.

Table 5 presents beginning daily measurements of TRC made during the seven day exposure period. TRC samples were taken 20 minutes following the introduction of the Composition A—Clorox and Clorox every eight hours to check dosing levels. The volatile nature of the chlorine accounts for some of the variability observed.

Survivorship of the large and small test organisms for the Composition A solutions and Clorox is presented in Table 6 and 7, respectively.

Maximum mortality in the 6.5:100 and 13:100 test series was 20 percent for adult mussels and 10 percent for juvenile mussels. The Clorox test series had negligible effect with only one small mussel mortality.

LATENT MORTALITY

To assess any latent (delayed) effects of the three exposure series, the mussels were held in clean water for four additional days. The mussels were fed at the end of the seven day exposure period and daily thereafter. The holding water was renewed with oxygen saturated, test temperature well water after the feeding period. Physical-chemical measurements of the water fell within the range of observations of the definitive test measurements. Latent mortality observations for the large and small mussels are presented in Tables 8 and 9, respectively.

From Tables 7 and 8 the mid to higher exposures to the 13:100 Composition A/Clorox series produced significant (>/−50 percent) mortality after two days (Day 9) in the recovery water. The 6.5:100 Composition A/Clorox and pure Clorox did not exhibit significant mortality during the post-exposure period.

The maximum mortality in the 13:100 series was observed for both size mussels on the same day (Day 9). No additional mortality was observed on Days 10 and 11 in the large mussels. The small mussel mortality increased by 5 percent on the 0.2 and 0.5 mg/l TRC exposures during the two remaining days of observation.

The latent mortality observations suggest that the 13:100 Composition A/Clorox oxidant ratio was the most effective for the test conditions. The latent observations also indicate that both size mussels exhibited delayed response to the seven days of exposure.

The invention is particularly significant in demonstrating its ability to include a latent mortality response on adult Zebra Mussels with intermittent application. Alternatively, continuous feed of chlorine can be used to kill off the adult mussels.

PREVENTION

In-field applications of chlorine and bromide confirm the ability of the invention to prevent infestation of treated plant piping and heat exchangers with macrofouling species such as Zebra Mussels. At one power plant on Lake Erie, the subject of this invention was originally used to control bacterial slime. Subsequent to discovery of Zebra Mussels in the Great Lakes, this plant's intake forebays, which are not treated, have become and remain infested with ever increasing numbers of Zebra Mussels. Plant systems receiving treatment, however, the same as the invention have not observed fouling from living Zebra Mussels.

We claim:

1. A method for controlling and preventing the growth and attachment of Zebra mussels to piping, heat exchange cooling water surfaces, and other cooling system materials constructed in contact with water containing Zebra mussels, the method comprising the step of intermittently treating the water with a low molecular weight, nonionic surface active biodispersant and a combination of chlorine and water-soluble bromide salts, the chlorine and bromide salts being added to the waters in a concentration of from 0.05 to 10 milligrams per liter of water, where the ratio of bromide salt to chlorine as hypochlorous acid is from about 0.25 to about 1.5 equivalent, whereby the intermittent addition of the surface active biodispersants, chlorine and bromide salts prevent the growth and attachment of a juvenile Dreissena Polymorpha form of the Zebra mussel on said surfaces.

2. The method of claim 1 wherein the surface active biodispersant has an HLB value of from 4 to about 10.

3. The method of claim 1 wherein the surface active biodispersant is added separately to the water containing zebra mussels.

4. The method of claim 1 wherein the surface active biodispersant is at least one biodispersant selected from the group consisting of ethylene oxide condensates with propylene oxide adducts, propylene glycols, nonionic polyethoxylated straight chain alcohols, tris cyanoethylated cocodiamines, polyoxyethylene sorbitan esters or acids, nonionic N,N, dimethyl stearamides, nonionic amine polyglycol condensates, and nonionic ethyoxylated alcohols.

* * * * *